United States Patent
Xiao et al.

(10) Patent No.: US 10,705,604 B2
(45) Date of Patent: Jul. 7, 2020

(54) EYE TRACKING APPARATUS AND LIGHT SOURCE CONTROL METHOD THEREOF

(71) Applicant: HTC Corporation, Taoyuan (TW)

(72) Inventors: Bo-Wen Xiao, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 90 days.

(21) Appl. No.: 16/158,310

(22) Filed: Oct. 12, 2018

(65) Prior Publication Data

US 2019/0361525 A1    Nov. 28, 2019

Related U.S. Application Data

(60) Provisional application No. 62/674,635, filed on May 22, 2018.

(51) Int. Cl.
   *G06F 3/01*    (2006.01)
   *G06T 7/00*    (2017.01)
   *H04N 5/235*   (2006.01)

(52) U.S. Cl.
   CPC ............ *G06F 3/013* (2013.01); *G06T 7/0002* (2013.01); *H04N 5/2354* (2013.01); *G06T 2207/10152* (2013.01); *G06T 2207/30168* (2013.01); *G06T 2207/30201* (2013.01)

(58) Field of Classification Search
   CPC .......... G06F 3/013; G06T 2207/10152; G06T 2207/30168; G06T 2207/30201; G06T 7/0002; H04N 5/2354
   See application file for complete search history.

(56) References Cited

U.S. PATENT DOCUMENTS

| | | | |
|---|---|---|---|
| 9,940,518 B1* | 4/2018 | Klingstrom | G06K 9/0061 |
| 2006/0170787 A1* | 8/2006 | Bentkovski | H04N 5/232 348/222.1 |
| 2009/0066863 A1* | 3/2009 | Chen | H04N 13/341 349/13 |
| 2009/0225278 A1* | 9/2009 | Chen | A61B 3/113 351/210 |
| 2012/0147328 A1* | 6/2012 | Yahav | A61B 3/113 351/210 |
| 2016/0085300 A1* | 3/2016 | Robbins | H04N 5/33 345/633 |
| 2016/0270655 A1* | 9/2016 | Caraffi | A61B 3/113 |
| 2017/0311793 A1* | 11/2017 | Green | A61B 3/113 |
| 2020/0129062 A1* | 4/2020 | Glik | G06T 7/0016 |

FOREIGN PATENT DOCUMENTS

| | | |
|---|---|---|
| CN | 105828700 | 8/2016 |
| CN | 106716223 | 5/2017 |
| TW | 201416908 | 5/2014 |
| TW | 201805856 | 2/2018 |

OTHER PUBLICATIONS

"Office Action of Taiwan Counterpart Application," dated Sep. 3, 2019, p. 1-p. 8.

\* cited by examiner

*Primary Examiner* — David Bilodeau
(74) *Attorney, Agent, or Firm* — JCIPRNET

(57) ABSTRACT

An eye tracking apparatus and a light source control method thereof are provided. The eye tracking apparatus includes a plurality of light sources, an image capturer and a controller. The light sources project a plurality of light beams to a target zone. The image capturer captures a display image on the target zone. The controller turn-off light beams corresponding to a part of light sources according to a contrast ratio of the display image.

13 Claims, 4 Drawing Sheets

EYE TRACKING APPARATUS AND LIGHT SOURCE CONTROL METHOD THEREOF

CROSS-REFERENCE TO RELATED APPLICATION

This application claims the priority benefit of U.S. provisional application Ser. No. 62/674,635, filed on May 22, 2018. The entirety of the above-mentioned patent application is hereby incorporated by reference herein and made a part of this specification.

BACKGROUND

Technical Field

The disclosure relates to an eye tracking apparatus and a light source control method thereof. More particularly, the disclosure relates to an eye tracking apparatus and a light source control method thereof capable of lowering influence brought by stray light.

Description of Related Art

Eye tracking apparatuses may be applied to virtual reality (VR) apparatuses and may be configured to generate the Foveated rendering function, reduce the amount of image processing ratios, and reduce system requirements. The eye tracking apparatuses may also be applied to the human-computer interaction interface, so as to allow systems to be used more conveniently.

In the eye tracking apparatus, an infrared ray light source is mainly used to project light beams projected on an eyeball, and pupil reflection or the position of the glint is thereby analyzed through the generated pupil reflection or glint, and that the position of the pupil is calculated through eyeball algorithms such as smoothing, denoising, dynamic compensation, motion compensation, etc.

Nevertheless, accuracy of eye tracking still cannot be significantly enhanced and thus is an important issue in this field. Herein, the reflecting surfaces of the cornea, pupil, iris, etc. of the human eye are not flat arc surfaces, but corrugated curved surfaces. As such, the reflected glint on the eyeball generates stray light when the eyeball is actually rolled to a certain angle, glint tracking is interfered, and accuracy of tracking is thus lowered.

SUMMARY

The disclosure provides an eye tracking apparatus and a light source control method thereof capable of increasing accuracy of eye tracking.

The eye tracking apparatus provided by an embodiment of the disclosure includes a plurality of light sources, an image capturer, and a controller. The light sources project a plurality of light beams to a target zone. The image capturer captures a display image on the target zone. The controller is coupled to the image capturer and turns off the light beams corresponding to a part of the light sources according to a contrast ratio of the display image.

The light source control method provided by an embodiment of the disclosure is adapted to an eye tracking apparatus. The light source control method includes the following steps. A plurality of light sources are enabled to project a plurality of light beams to a target zone. A display image generated on the target zone is captured. The light beams generated corresponding to a part of the light sources are turned off according to a contrast ratio of the display image.

To sum up, in the embodiments of the disclosure, the display image generated on the eyeball is captured. The contrast ratio of the display image is detected, so as to turn off the light beams projected to the non-ocular zone. In this way, the stray light projected on the eyeball may be eliminated, and accuracy of eye tracking is enhanced.

To make the aforementioned more comprehensible, several embodiments accompanied with drawings are described in detail as follows.

DESCRIPTION OF THE EMBODIMENTS

Figure 1:
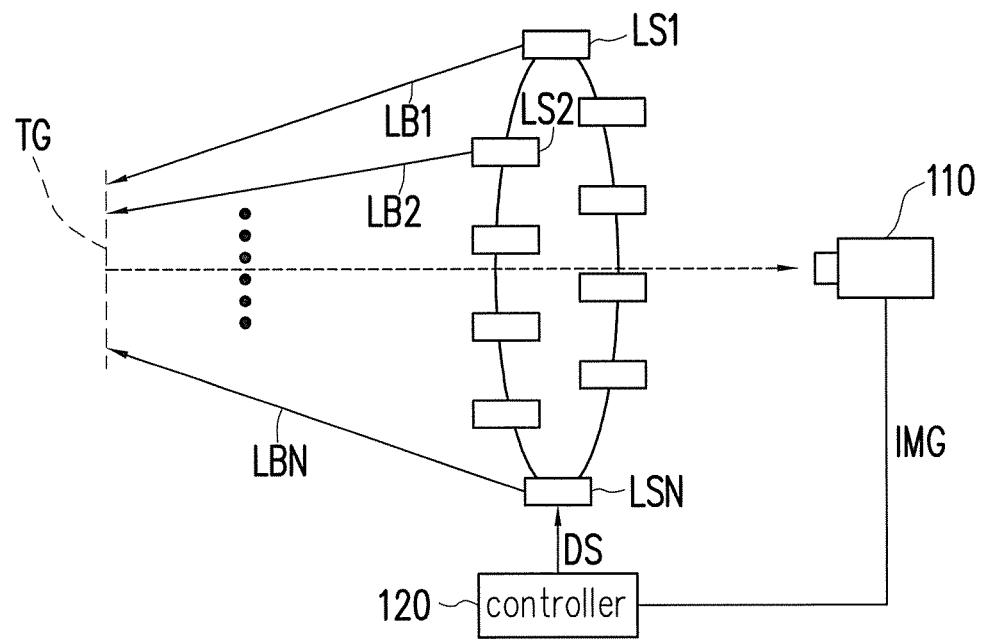
FIG. 1 is a schematic view illustrating an eye tracking apparatus according to an embodiment of the disclosure.

With reference to FIG. 1, FIG. 1 is a schematic view illustrating an eye tracking apparatus according to an embodiment of the disclosure. An eye tracking apparatus 100 includes a plurality of light sources LS1 to LSN, an image capturer 110, and a controller 120. The light sources LS1 to LS are configured to respectively project a plurality of light beams LB1 to LBN to a target zone TG. The image capturer 110 is configured to capture a display image IMG generated on the target zone TG. The controller 120 is coupled to the image capturer 110 and the light sources LS1 to LSN. The controller 120 receives the display image IMG captured by the image capturer 110 and analyzes the display image. Herein, the controller 120 analyzes a contract ratio of the display image IMG to determine whether to turn off the light beams LB1 to LBN generated corresponding to a part of the light sources LS1 to LSN.

In this embodiment, the light sources LS1 to LSN can be infrared ray transmitters, and the image capturer 110 can be an infrared camera.

Figure 2:
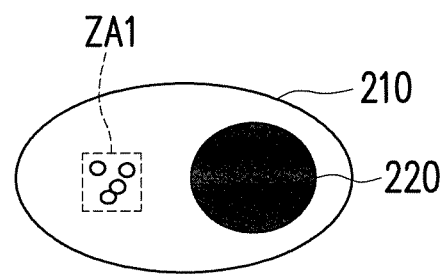
FIG. 2 is a schematic view illustrating a display image according to an embodiment of the disclosure.

Furthermore, with reference to FIG. 1 and FIG. 2 together, FIG. 2 is a schematic view illustrating a display image according to an embodiment of the disclosure. When eye tracking is performed, the light sources LS1 to LSN may respectively project the light beams LB1 to LBN to an eye 210 on the target zone TG, and the image capturer 110 may perform image capturing on the target zone TG and obtains the display image IMG. In a display image 200, due to an offset caused by an eyeball 220, the light beam received by a zone ZA1 (corresponding to the white portion of the eye) generates stray light in the zone ZA1 and lower the contrast ratio of the zone ZA1. In this way, the controller 120 may look up the light source correspondingly projecting the light beam to the zone ZA1 and generates a command signal DS to enable the light source correspondingly projecting the light beam to the zone ZA1 to be turned off. The light beam is thereby prevented from being projected to the zone ZA1 of the white of the eye, and that the stray light is less likely to be generated.

To be specific, when the eye tracking is performed, the controller 120 may determine the contrast ratios of images of multiple zones on the display image 200. The contrast ratio of the image of each of the zones is compared with a pre-determined reference value, and a determination result is generated. When the contrast ratio of the image of one of the zones (e.g., zone ZA1) is less than the reference value, the controller 120 may look up one or a plurality of first light sources corresponding to one or a plurality of light beams projected to the zone ZA1 and turns off the light beam or light beams generated by the first light source or the first light sources by transmitting the command signal DS, so as to reduce the occurrence of stray light.

As a side note, projection positions of the light beams LB1 to LBN correspondingly generated by the light sources LS1 to LSN correspond to the zones on the display image IMG. Therefore, the light sources LS1 to LSN and the zones on the display image IMG feature a corresponding relationship, and the corresponding relationship may be pre-stored in the controller 120. When the contrast ratio of the zone ZA1 is calculated to be less than the reference value, the controller 120 may look up the light source needed to be turned off through the foregoing corresponding relationship. Certainly, in other embodiments of the disclosure, the foregoing corresponding relationship may also be stored in an external storage apparatus (e.g., a memory) and allows the controller 120 to perform reading.

In an embodiment of the disclosure, the image capturer 110 may capture a plurality of time-division display images respectively at a plurality of time intervals in a setting period. The controller 120 obtains a plurality of turning on/turning off states of the light sources LS1 to LSN according to the contrast ratios of a plurality of zones in each of the obtained time-division display images. It is worth noting that a decrease in the contrast ratios of the zones in the time-division display images may be caused owing to changing of the field of view (FOV) of a user. Therefore, the controller 120 may calculate a plurality of field of view information of the eyeball according to the contrast ratios of the zones of the time-division display images at the same time.

Based on the above description, the controller 120 may thereby establish a relationship between the turning on/turning off states of the light sources LS1 to LSN and the field of view information of the eyeball and records the corresponding relationship between the turning on/turning off states and the field of view information in a lookup table. When the setting period is over, the controller 120 may look up current turning on/turning off information of the light sources LS1 to LSN according to a current field of view of the eyeball of the user through the configured lookup table. The controller 120 then generates the command signal DS according to the current turning on/turning off information to drive the light sources LS1 to LSN, and reduce stray light by turning off a part of the light sources.

Figure 3:
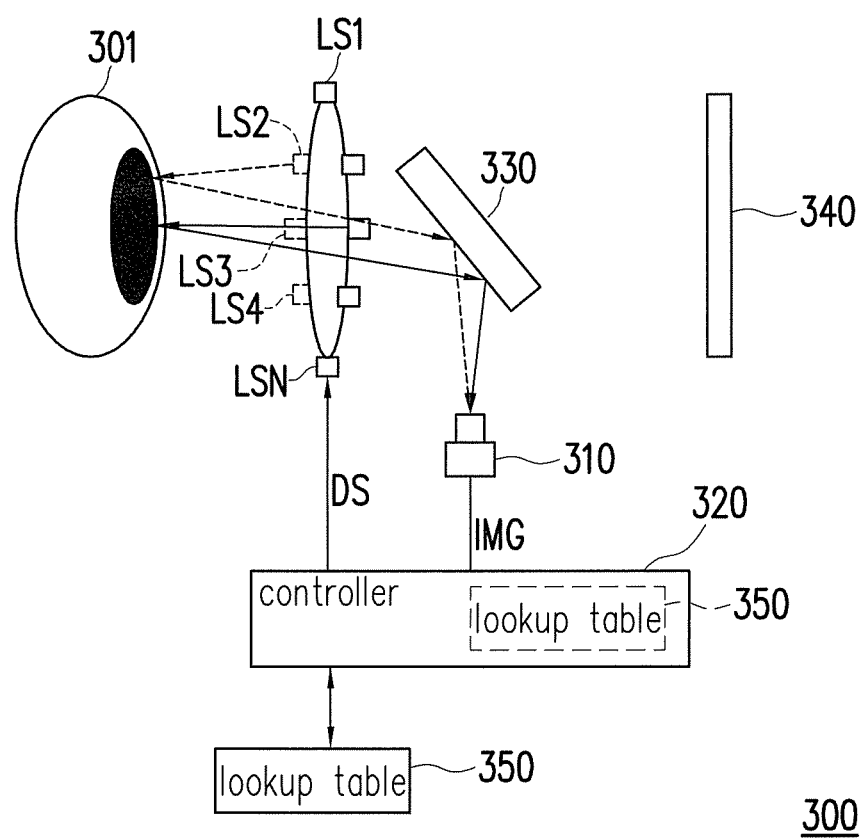
FIG. 3 is a schematic view illustrating an eye tracking apparatus according to another embodiment of the disclosure.

With reference to FIG. 3, FIG. 3 is a schematic view illustrating an eye tracking apparatus according to another embodiment of the disclosure. An eye tracking apparatus 300 includes a plurality of light sources LS1 to LSN, an image capturer 310, a controller 320, a light reflection device 330, and a lookup table 350. In implementation of the eye tracking apparatus 300 being applied to a head-mounted display apparatus, a display 340 may be disposed in a field of view range of an eye 301.

In the embodiment, the light sources LS1 to LSN project a plurality of light beams to the eye 301 on a target zone. The light reflection device 330 receives and reflects the display image IMG of the eye 301 to the image capturer 310. The controller 320 is coupled to the image capturer 310 and the light sources LS1 to LSN. The controller 320 receives the display image IMG and analyzes the contrast ratio of the display image IMG. The controller 320 additionally generates the command signal DS through a result of the analysis, and controls the turning on or turning off states of each of the light sources LS1 to LSN through the command signal DS.

Since the method of determining the turning on or turning off states of the light sources LS1 to LSN are described in detail in the foregoing embodiments, a relevant description thereof is thus omitted.

It is worth noting that in the embodiments of the disclosure, the lookup table 350 is configured to store the relationship between the turning on/turning off states of the light sources LS1 to LSN and the field of view information of the eyeball. The lookup table 350 may be implemented as a memory of any form and is not particularly limited. The lookup table 350 may be external to the controller 320 and coupled to the controller 320. Alternatively, the lookup table 350 may also be embedded in the controller 320.

Figure 4:
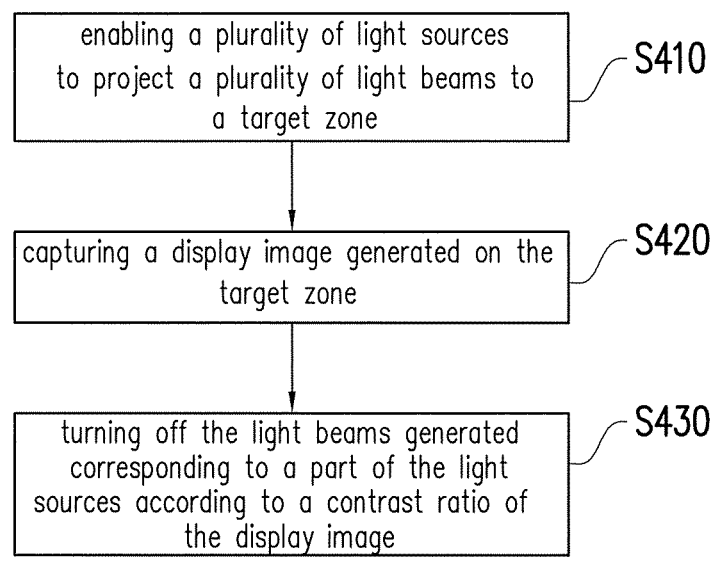
FIG. 4 is a flow chart illustrating a light source control method according to an embodiment of the disclosure.

With reference to FIG. 4, FIG. 4 is a flow chart illustrating a light source control method according to an embodiment of the disclosure. In FIG. 4, in step S410, a plurality of light sources are enabled to project a plurality of light beams to a target zone. A display image generated on the target zone is captured in step S420. The light beams corresponding to a part of the light sources are turned off according to a contrast ratio of the display image in step S430.

Details of the above steps are described in the foregoing embodiments, and a relevant description thereof is thus omitted.

Figure 5:
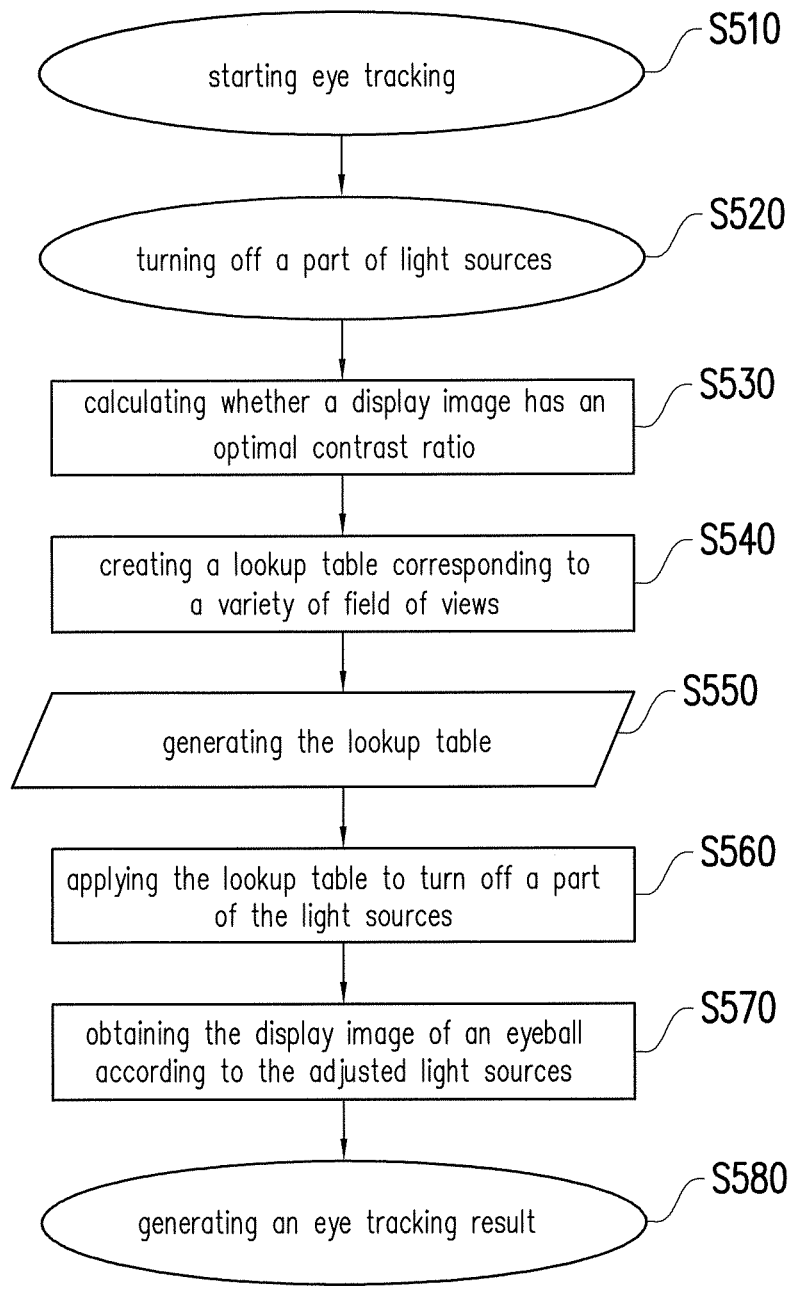
FIG. 5 is a flow chart illustrating a light source control method according to an embodiment of the disclosure.

With reference to FIG. 5, FIG. 5 is a flow chart illustrating an eye tracking movement. In FIG. 5, eye tracking is performed in step S510. In step S520, a part of light sources is turned off through analyzing a contrast ratio of a display image of an eye of a user. Next, in step S530, whether the display image of the eye of the user features a favorable contrast ratio is calculated, and when the display image of the eye of the user features a favorable contrast ratio, step S540 is performed to create a lookup table corresponding to a variety of field of views.

Note that if an unfavorable contrast ratio of the display image is calculated in step S530, more light sources may be turned off, so as to lower influence brought by stray light. For instance, according to the description of the foregoing embodiments, the controller may attempt to lower the pre-determined reference value and re-compares the contrast ratios of the zones of the display image with the adjusted reference value and generates new determination results, so as to determine the turning on or turning off state of the light sources through the new determination results.

The lookup table is generated in step S550, and the lookup table is applied in step S560, so as to look up current turning on/turning off information of the light sources according to the current field of view of an eyeball of the user and turn off a part of the light sources. The display image of the eyeball is obtained in step S570 according to the adjusted light sources. A result of eye tracking may be generated in step S580 according to the display image of the eyeball.

In the embodiment, step S560 to step S580 may be repeatedly performed, and the eye tracking may be performed on the continuously-moving eyeball. Since the display image with the favorable contrast ratio and low interference of stray light can be obtained in step S570, accuracy of the eye tracking result obtained in S580 may be effectively increased.

In summary, the contrast ratio of the display image of the eye of the user is detected in the disclosure, so as to turn off a part of the light sources. The number of the light beams is decreased, the influence brought by the stray light is reduced, and that accuracy of eye tracking is enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A eye tracking apparatus, comprising:
a plurality of light sources, configured to project a plurality of light beams to a target zone;
an image capturer, configured to capture a display image generated on the target zone;
a controller, coupled to the image capturer and the plurality of light sources, turning off the plurality of light beams generated corresponding to a part of the light sources according to a contrast ratio of the display image; and
a lookup table, coupled to the controller, recording a corresponding relationship between a plurality turning on/turning off states and a plurality of field of view information.

2. The eye tracking apparatus as claimed in claim 1, wherein the plurality of light sources are configured to project the plurality of light beams to a plurality of positions of the target zone, and the display image has a plurality of zones corresponding to the plurality of positions.

3. The eye tracking apparatus as claimed in claim 2, wherein the controller determines that whether the contrast ratios of the plurality of zones are less than a reference value to generate a plurality of determination results and determines that whether to turn off each of the plurality of light sources corresponding to each of the plurality of zones according to each of the plurality of determination results.

4. The eye tracking apparatus as claimed in claim 3, wherein the controller generates a command signal to turn off each of the plurality of light sources corresponding to each of the plurality of zones when each of the plurality of determination results indicates that the contrast ratio of each of the plurality of zones is less than the reference value.

5. The eye tracking apparatus as claimed in claim 1, wherein the image capturer captures a plurality of time-division display images at a plurality of time intervals, the controller obtains the plurality of turning on/turning off states of the plurality of light sources according to the contrast ratios of a plurality of zones of the time-division display images, and the controller calculates a plurality of field of view information of an eyeball according to the contrast ratios of the plurality of zones of the plurality of time-division display images.

6. The eye tracking apparatus as claimed in claim 1, wherein the controller is further configured to:
look up current turning on/turning off information of the plurality of light sources through the lookup table according to a current field of view of an eyeball, and drive the plurality of light sources according to the current turning on/turning off information.

7. The eye tracking apparatus as claimed in claim 1, further comprising:
a light reflection device, receiving and reflecting the display image to the image capturer.

8. A light source control method, adapted to an eye tracking apparatus, comprising:
enabling a plurality of light sources to project a plurality of light beams to a target zone;
capturing a display image generated on the target zone; and
turning off the light beams generated corresponding to a part of the plurality of light sources according to a contrast ratio of the display image,
the light source control method further comprising:
recording a corresponding relationship between a turning on/turning off states and the plurality of field of view information to a lookup table.

9. The light source control method as claimed in claim 8, wherein the step of enabling the plurality of light sources to project the plurality of light beams to the target zone comprises:
projecting the plurality of light beams to a plurality of positions of the target zone by the plurality of light sources,
wherein the display image has a plurality of zones corresponding to the positions.

10. The light source control method as claimed in claim 9, wherein the step of turning off the plurality of light beams generated corresponding to the part of the plurality of light sources according to the contrast ratio of the display image comprises:
determining that whether the contrast ratios of the plurality of zones are less than a reference value to generate a plurality of determination results and turning off each of the plurality of light sources corresponding to each of the plurality of zones according to each of the plurality of determination results.

11. The light source control method as claimed in claim 9, wherein the step of turning off each of the plurality of light sources corresponding to each of the plurality of zones according to each of the plurality of determination results comprises:
generating a command signal to turn off each of the plurality of light sources corresponding to each of the plurality of zones when each of the plurality of determination results indicates that the contrast ratio of each of the plurality of zones is less than the reference value.

12. The light source control method as claimed in claim 8, further comprising:
capturing a plurality of time-division display images at a plurality of time intervals;
obtaining the plurality of turning on/turning off states of the plurality of light sources according to the contrast ratios of a plurality of zones of the plurality of time-division display images, and
calculating a plurality of field of view information of an eyeball according to the contrast ratios of the plurality of zones of the plurality of time-division display images.

13. The light source control method as claimed in claim 8, further comprising:
looking up current turning on/turning off information of the plurality of light sources through the lookup table according to a current field of view of the an eyeball, and driving the plurality of light sources according to the current turning on/turning off information.

* * * * *